(12) United States Patent
Pierce

(10) Patent No.: US 7,129,412 B2
(45) Date of Patent: Oct. 31, 2006

(54) ADAPTER PLATE FOR ELECTRICAL COMPONENTS INSTALLED INTO EXPOSED LOGS IN LOG-CONSTRUCTION BUILDINGS

(76) Inventor: Kevin R. Pierce, 10424 E. Greenvale Rd., Stockton, IL (US) 61085

( * ) Notice: Subject to any disclaimer, the term of this patent is extended or adjusted under 35 U.S.C. 154(b) by 0 days.

(21) Appl. No.: 10/755,839

(22) Filed: Jan. 12, 2004

(65) Prior Publication Data

US 2005/0150675 A1 Jul. 14, 2005

(51) Int. Cl.
*H02G 3/14* (2006.01)
(52) U.S. Cl. .................. 174/66; 174/48; 174/52.1; 174/50; 174/55; 174/53; 174/58; 174/61; 174/67; 220/3.2; 220/3.3; 220/3.8; 220/241; 220/242; 220/3.92; 220/3.94; 220/3.9
(58) Field of Classification Search ................ 174/66, 174/48, 52.1, 50, 55, 53, 58, 61, 67; 220/3.2, 220/3.3, 3.8, 241, 242, 3.92, 3.94, 3.9
See application file for complete search history.

(56) References Cited

U.S. PATENT DOCUMENTS

| | | | | |
|---|---|---|---|---|
| 5,317,108 A | * | 5/1994 | Prairie, Jr. ............... | 174/67 |
| 6,098,825 A | * | 8/2000 | Kohnen ................... | 220/3.2 |
| 6,376,770 B1 | * | 4/2002 | Hyde ...................... | 174/58 |
| 6,421,941 B1 | * | 7/2002 | Finke et al. ............. | 40/611.05 |
| 6,462,278 B1 | * | 10/2002 | Vrame .................... | 174/67 |

* cited by examiner

*Primary Examiner*—Dean A. Reichard
*Assistant Examiner*—Anton Harris

(57) ABSTRACT

An adapter plate to provide a stable supporting transition between the curvature of an exposed log in a log-construction building and electrical components to be installed into the log includes a substantially flat front side, a curved back side, and a center opening. The back side is provided with a smooth curvature complimentary to the curvature of the exposed log surface for snug installation thereto and tracking engagement therewith. The center opening is sized to slidably receive an electrical box into which the component is to be installed. The front side is configured to support the electrical box and for snug installation of the cover plate. The adapter plate is configurable for use with one or more electrical boxes ganged together. The adapter plate conceals the entire electrical box and the space between the component and the log.

6 Claims, 3 Drawing Sheets

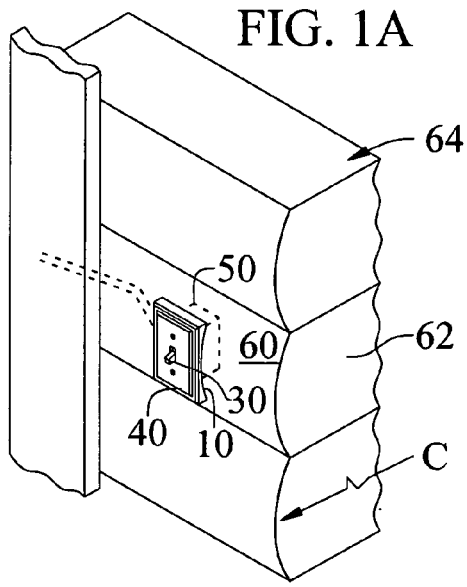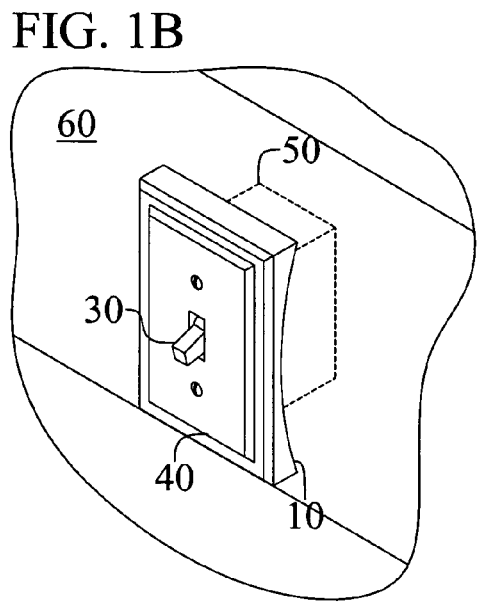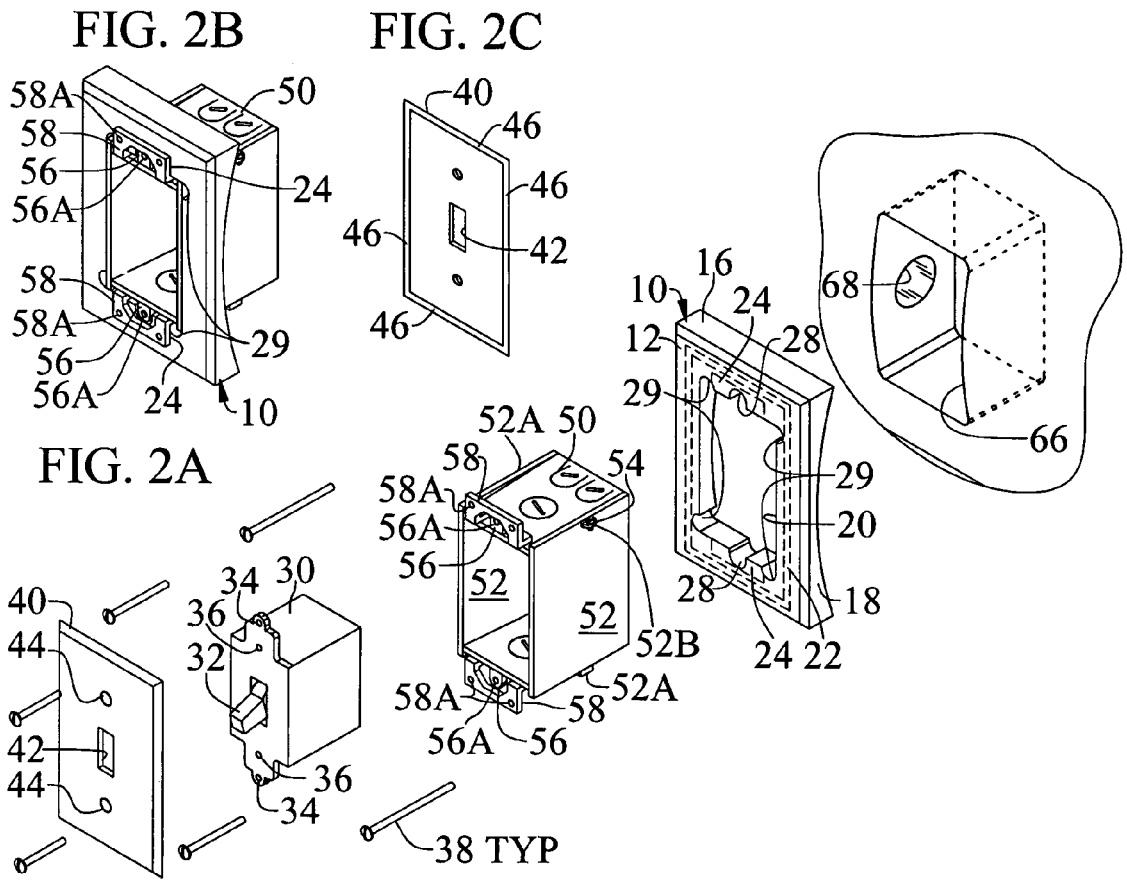

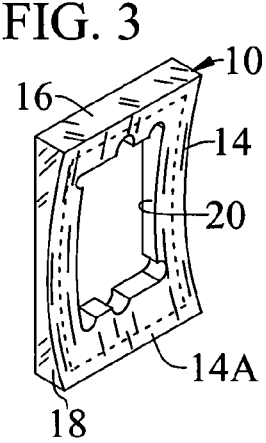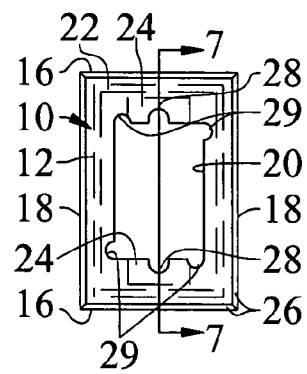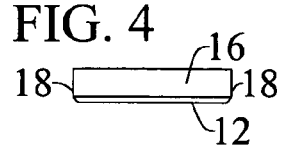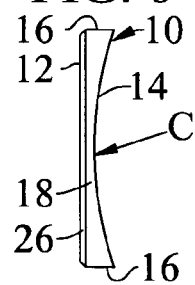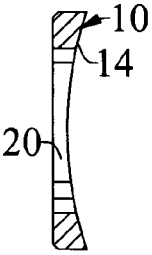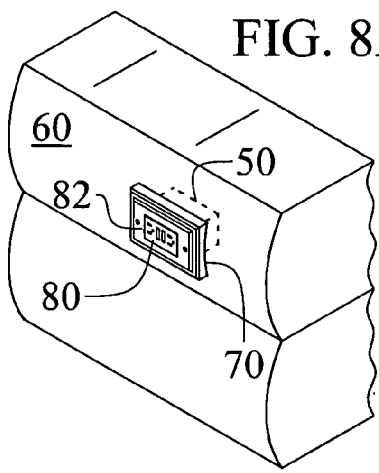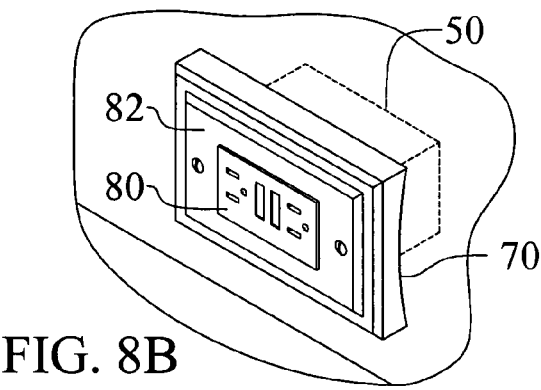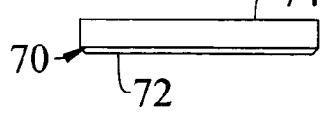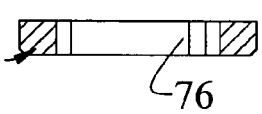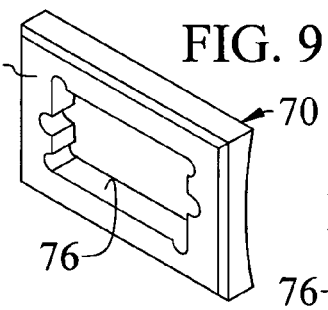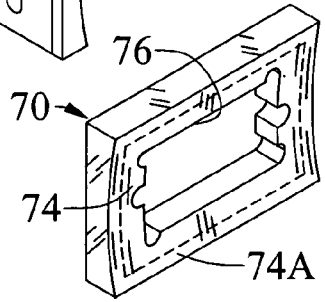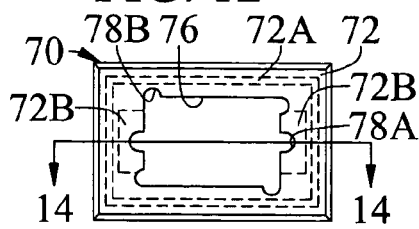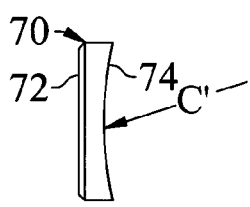

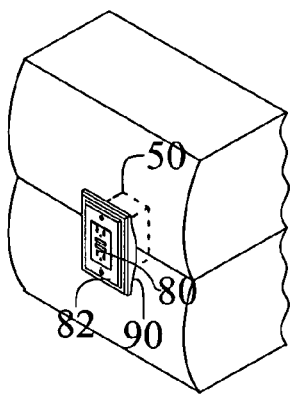
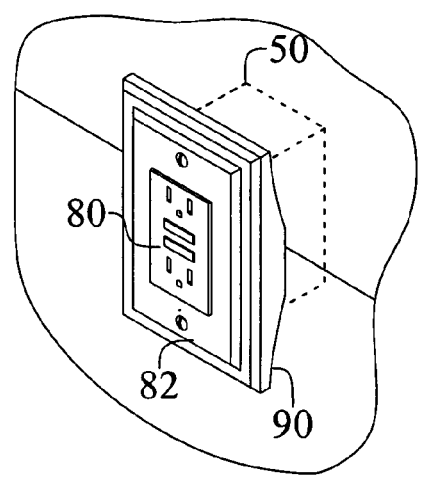
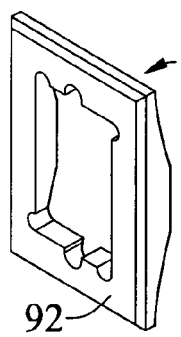
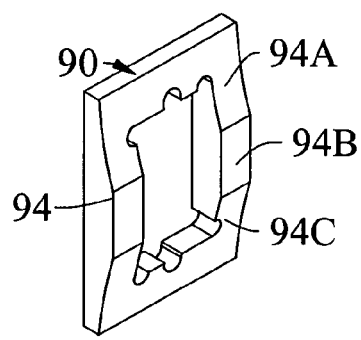
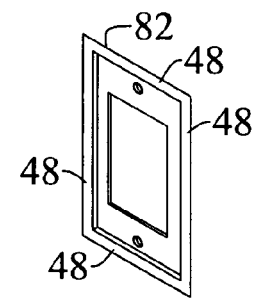
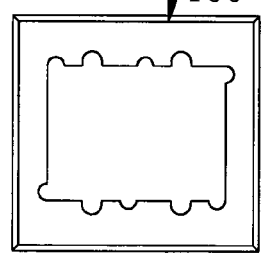
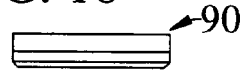
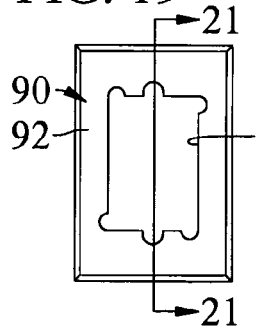
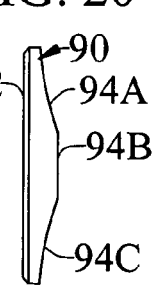
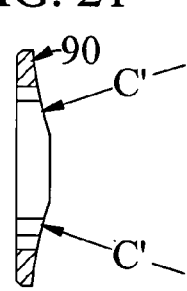
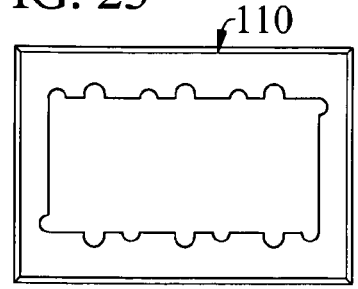

ADAPTER PLATE FOR ELECTRICAL COMPONENTS INSTALLED INTO EXPOSED LOGS IN LOG-CONSTRUCTION BUILDINGS

Cross-references to related applications: None.

Statement regarding federally sponsored research or development: Not applicable.

Reference to a sequence listing, table, or computer program listing appendix submitted on a compact disc and incorporation-by-reference of the material on the compact disc: Not applicable.

BACKGROUND OF THE INVENTION

1. Field of Invention

The present invention relates to an adapter plate for use with electrical switches, electrical outlets and similar components installed into exposed logs in log-construction buildings such as, but not limited to, as commonly encountered in log homes.

More particularly, the invention relates to an adapter plate that transitions between the curvature of the exposed side of such construction logs and the exposed boxes, components and covers to be installed into the logs.

2. Description of Related Art

Installation of electrical switches, electrical outlets and similar components into exposed logs of log-construction buildings presents several challenges. Unlike new building construction, access to installation locations is limited due to the relatively solid nature of log walls. Wiring, junction boxes, outlet and switch boxes, and other electrical wiring components must typically be installed through or into the relatively solid logs after the logs are secured in position in the building. In the trades, this is commonly known as rework type wiring because, for example, holes must often be drilled through the logs to run wiring, and holes must be formed in the logs for installation of switch and outlet boxes after the logs are secured in place.

As relates to the present invention, the curvature of the exposed sides of the logs creates difficulties when installing electrical outlets, switches and like components because such components are configured for normal installation into flat walls. In particular, the back sides of such components, such as mounting tabs on rework-type electrical boxes, and the back sides of conventional outlet and switch covers are generally flat, or provided with a flat perimeter for snug installation against a flat wall. Therefore, such components are not conveniently or desirably installed snugly against the curvature of an exposed log, and attempting direct snug installation of such components onto the curvature of a log can result in deformation of the components, or cracking of breaking in the case of plastic components. And even if installed, there is the likelihood of an aesthetically undesirable and unsafe space between the face of the log and the back sides of such components.

The conventional technique to overcome these difficulties is to create a flat surface area on the exposed curvature of a log of a size suitable for accommodation of the back side of the switch or outlet cover, or other component as required, and then hollow out the log in the center of the flat area for installation of the components into the opening in the log and securing to the flat surface surrounding the opening in the log. However, this is a labor intensive, and therefore, relatively expensive technique.

Installation of electrical outlets, switches and other such components into construction logs should not be such a difficult task. It would be convenient if such components could be installed into construction logs with the same basic techniques as used for installation into existing walls. Accordingly, there is a need for a device method that eliminates the need to establish a flat surface on the construction log prior to installation of such electrical components.

BRIEF SUMMARY OF THE INVENTION

The general aim of the present invention is to provide a new and unique device that eliminates the need to establish a flat surface on the exposed curvature of construction logs prior to installation of electrical outlets, switches and like components thereto.

Another aim of the invention is to provide a new and unique device that enables installation of such components with the same basic techniques as used for installation into existing flat walls.

An important objective of the invention is to provide such a device that is relatively simple in construction, and that can be manufactured and distributed at a relatively low cost.

Yet another important objective of the invention is to provide such a device that is configured for self-explanatory ease of use by both the seasoned professional and the home owner for ease of installation into both new and existing log homes.

These and other objectives and advantages of the invention will become more apparent from the following detailed description when taken in conjunction with the accompanying drawings.

Briefly, the present invention provides an adapter plate for use with electrical switches, electrical outlets and similar components to be installed into exposed logs in log-construction buildings. The adapter plate includes a substantially flat front side, a curved back side, and a center opening. The back side of the adapter plate is provided with a smooth curvature complimentary to the curvature of the exposed log surface for snug installation thereto and tracking engagement therewith. The center opening is sized to slidably receive an electrical box, such as of the type commonly referred to as a switch box or outlet box, and into which the switch, outlet or other component is to be installed. The substantially flat front side of the adapted plate is configured to support the mounting or positioning tabs of the electrical box and for snug installation of the cover plate thereto. The result is a unique configuration adapter plate that provides a stable supporting transition between the curvature of the log, the electrical box, and the component and cover installed thereto, without the need to form a flat component or cover supporting surface on the log. The preferred adapter plate is configured for use with a gangable-type electrical box, and may be provided for use with one or more electrical boxes ganged together. The configuration, materials, and aesthetics of the adapter plate ensures that the entire electrical box, and space between the component and the log, are concealed in an manner aesthetically complimentary with the log wall in which it is installed. For complimentary visual aesthetics with the logs, the preferred adapter plate is either produced from wood, or from molded plastic with a preferred simulated wood exterior.

BRIEF DESCRIPTION OF THE SEVERAL VIEWS OF THE DRAWINGS

FIG. 1A is a perspective view of a first embodiment adapter plate in accordance with invention as installed with a switch into the exposed face of a construction log.

FIG. 1B is an enlarged perspective view of the installed adapter plate and components shown in FIG. 1.

FIG. 2A is an exploded perspective view of the adapter plate and components shown in FIGS. 1A–B.

FIG. 2B is a perspective of the first embodiment adapter plate and electrical box assembled together.

FIG. 2C is a rear perspective view of the switch cover plate.

FIG. 3 is a rear perspective view of the first embodiment adapter plate.

FIG. 4 top plan view of the first embodiment adapter plate, the bottom plan view being a mirror image thereof.

FIG. 5 is a front elevation view of the first embodiment adapter plate.

FIG. 6 a side elevation view of the first embodiment adapter plate, the opposite side elevation view being a mirror image thereof.

FIG. 7 is a cross-sectional view taken along the line 7—7 of FIG. 5.

FIG. 8A is a perspective view similar to FIG. 1A of a second embodiment adapter plate as installed into a construction log with an electrical outlet.

FIG. 8B is an enlarged perspective view of the installed outlet and adapter plate shown in FIG. 8A, FIG. 9 is a front perspective view of the second embodiment adapter plate.

FIG. 10 is a rear perspective view of the second embodiment adapter plate.

FIG. 11 top plan view of the second embodiment adapter plate the bottom plan view being a mirror image thereof.

FIG. 12 is a front elevation view of the second embodiment adapter plate.

FIG. 13 a side elevation view of the second embodiment adapter plate, the opposite side elevation view being a mirror image thereof.

FIG. 14 is a cross-sectional view taken along the line 14—14 of FIG. 12.

FIG. 15A is a perspective view similar to FIG. 1A of a third embodiment adapter plate as installed into a construction log with an electrical outlet.

FIG. 15B is an enlarged perspective view of the installed outlet and adapter plate shown in FIG. 15A, FIG. 16 is a front perspective view of the third embodiment adapter plate.

FIG. 17 is a rear perspective view of the third embodiment adapter plate.

FIG. 18 top plan view of the third embodiment adapter plate the bottom plan view being a mirror image thereof.

FIG. 19 is a front elevation view of the third embodiment adapter plate.

FIG. 20 a side elevation view of the third embodiment adapter plate, the opposite side elevation view being a mirror image thereof.

FIG. 21 is a cross-sectional view taken along the line 21—21 of FIG. 19.

FIG. 22 is a front view of a fourth embodiment adapter plate in accordance with the invention.

FIG. 23 is a front view of a fifth embodiment adapter plate in accordance with the invention.

FIG. 24 is a rear perspective view of the electrical outlet cover plate shown in FIGS. 8A–B and 15A–B.

Reference numerals shown in the drawings correspond to the following items:

10—first embodiment adapter plate
12—front face
14—back face
14A—back side support zone
16—top and bottom faces
18—side faces
20—center opening
22—cover support zone
24—upper and lower pad zones
26—chamfer
28—upper and lower center slots
29—side slots
30—switch
32—switch lever
34—outer clearance holes
36—inner threaded holes
38—threaded fasteners
40—switch cover plate
42—center opening in cover plate
44—clearance holes
46—back perimeter of switch cover plate
48—back perimeter of outlet cover plate
50—electrical box
52—removable sides of electrical box
52A—side release clips
52B—release tabs
54—release screws
56—upper and lower center tabs
56A—threaded holes in center tabs 56
58—upper and lower positioning tabs
58A—clearance holes in positioning tabs 58
60—exposed face of construction log
62—construction log
64—log wall
66—opening in log
68—passage in log for electrical wire
70—second embodiment adapter plate
72—front face
72A—cover support zone
72B—pad zones
74—back face
74A—back face support zone
76—center opening
78A—center slots
78B—side slots
80—electrical outlet
82—electrical outlet cover
90—third embodiment adapter plate
92—front face
94—back face
94A—top curved part of back face
94B—bottom curved part of back face
94C—center part of back face
96—center opening
100—fourth embodiment adapter plate
110—fifth embodiment adapter plate While the invention is susceptible of various modifications and alternative constructions, certain illustrated embodiments have been shown in the drawings and will be described below in detail. It should be understood, however, that there is no intention to limit the invention to the specific forms disclosed, but on the contrary, the intention is to cover all modifications, alternative constructions, and equivalents falling within the spirit and scope of the invention.

DETAILED DESCRIPTION OF THE INVENTION

Adapter plates in accordance with the invention provide for ease of installation of conventional electrical switches, outlets, and other components into a curved wall (floor or ceiling) structure, such as into exposed curvature of logs used in log-construction homes and other buildings. In particular, adapter plates in accordance with the invention establish a mounting transition between the curved wall mounting structure and such components configured to be normally installed in a flat wall structure.

For purposes of illustration, adapter plates in accordance with the invention are shown in the drawings and described below in five different embodiments. The first embodiment adapter plate 10 (FIGS. 1–7) is shown and described in connection with an electrical box mounted single-unit wall switch. The second embodiment adapter plate 70 (FIGS. 8–14) and third embodiment adapter plate 90 (FIGS. 15–21) are shown and described in connection with an electrical box mounted single-unit electrical outlet. Such illustrations are for convenience only, and it should be understood that adapter plates in accordance with the invention can be used interchangeably with these and other components of the same general type, and can be alternately configured for use with multi-unit components installed into "ganged" electrical boxes. Accordingly, the fourth embodiment adapter plate 100 (FIG. 22) is configured for use with two such components and a double-cavity or two ganged electrical boxes, and the fifth embodiment adapter plate 110 (FIG. 23) is configured for use with three components and a triple-cavity or three ganged electrical boxes.

For further purposes of illustration, the first three embodiment adapter plates are shown and described as installed into the exposed curved face of horizontally positioned logs. These embodiments are distinguished primarily as to installation position and orientation on the log. The first embodiment adapter plate 10 is positioned approximately vertically centered in the exposed face of the horizontal log, with the longitudinal axis of the single-cavity electrical box associated therewith oriented vertically (i.e., perpendicular to the longitudinal axis of the log). The second embodiment adapter plate 70 is positioned approximately vertically centered in the exposed face of the log, with the longitudinal axis of the single-cavity electrical box oriented horizontally with the log. The third embodiment adapter plate 90 is positioned approximately vertically centered between the exposed faces of two stacked logs, with the longitudinal axis of the single-cavity electrical box oriented vertically, and the box and adapter plate bridging across the joint between the two logs. Such installation embodiments are for convenience only, and it should be understood that adapter plates in accordance with the invention can be provided in alternate configurations and/or installed in alternate positions and orientations, and on vertically or otherwise positioned logs (or other curved wall, etc. structures).

Referring more specifically to the drawings, the first embodiment adapter plate 10 is shown in FIGS. 1A and 1B as installed with wall switch 30, switch cover plate 40 and electrical box 50 into the exposed face 60 of a construction log 62 that is one of similarly configured logs secured together to establish the wall 64 such as conventionally built in log homes and other log construction buildings. These items are shown in an exploded perspective view in FIG. 2A, and with the adapter plate and electrical box shown assembled together in FIG. 2B.

The switch 30 shown is a conventional two-position, toggle-type on-off switch that includes a switch lever 32, a pair of outer, upper and lower, clearance holes 34 for use in securing the switch to the box 50 with threaded fasteners generally designated as 38, and a pair of inner, upper and lower, threaded holes 36 for use in securing the cover plate 40 to the switch. As will be apparent, the adapter plate may be used with most any wall-mount switch configuration, such as but not limited to a variable resistance rotary dimmer switch, as well as with, for example, electrical outlets as discussed further below, and other wall-mount type components configured with the same general construction or for the same general installation techniques.

The cover plate 40 is also of conventional construction, with a center opening 42 through which the lever 32 extends, and a pair of upper and lower clearance holes 44 spaced for alignment with the threaded holes 36 of the switch 30 for use in securing the switch plate to the switch. As shown in FIG. 2C, the back side of the cover plate is provided with a generally rectangular, substantially flat perimeter 46 that is characterized with rearwardly facing surfaces generally surrounding the cover plate and lying in a single plane to establish stable support for the perimeter of the plate on a flat surface such as a conventional wall. The back side perimeter of the conventional cover plate is formed continuously flat around the outer edge thereof, in plane parallel to the front face of the cover plate.

The electrical box 50 shown is a conventional gangable-type box, with removable sides 52 that are clipped to the box center at opposite diagonal corners as indicated at 52A, and that includes release screws 54 threaded through tabs 52B at the other set of opposite diagonal corners to secure the sides 52 in position on the box. Removal of the release screws enables unclipping and removal of the sides from the box. Thereafter, the open sides of two boxes can be connected (ganged) together to establish a double-sized electrical box for increased interior space, by re-installing the release screws through engaging complimentary tabs (52A, 52B) on the two boxes. The electrical box also includes upper and lower component mounting tabs 56 extending upwardly and downwardly, respectively, from the center front edges of the box, and upper and lower positioning tabs 58. The center tabs 56 are provided with threaded holes 56A for use in securing the switch 30 to the electrical box with threaded fasteners 38, and the positioning tabs 58 are configured and provided with clearance holes 58A for positioning and normally securing (with fasteners) the box to the wall into which the box is to be installed.

As shown in FIGS. 2–7, the adapter plate 10 includes a front face 12, a back face 14, top and bottom faces 16, opposite side faces 18, and a center opening 20. The top and bottom faces, and the side faces extend from front to back generally between the front and back faces, with the top faces extending side to side generally between the side faces, and therefore, with the side faces extending and from top to bottom generally between the top and bottom faces. The top, bottom and side faces, when combined with any outer exposed perimeter of the front face (discussed below), cooperate to establish the visual transition between the front face 60 of the log 62, and the switch 30 and cover plate 40.

The front face 12 is substantially flat, extending between the front edges of the top, bottom and side faces. More particularly, the front face is provided with a flat, generally rectangular zone 22, complimentary in size with the perimeter 46 on the back side of the cover plate 40, to engage the perimeter 46 and support the cover plate in a flat condition when secured in position over the installed switch 30. This rectangular zone is represented in FIGS. 2A and 5 as between two sets of rectangularly connected dashed lines shown on the front face of the adapter plate. Accordingly, the zone 22 of the adapter plate is characterized with forwardly facing surfaces generally surrounding the front face, and configured for alignment with the back side flat perimeter 46 of the cover plate for contact engagement therebetween. The front face of the adapter plate is further provided with substantially flat upper and lower pad zones 24 located between the center opening 20 and the upper and lower portions of the rectangular zone 22. The pad zones 24 are sufficiently flat, generally extending through the same plane to establish stable contact engagement with the positioning tabs 58 of the electrical box 50 when secured into its installed position. The perimeter of the front face outside the rectangular support zone 22 cooperates with the top, bottom and sides of the adapter plate to establish the visual transition between the switch cover plate and the front of the log. In the embodiment shown, the outer edges of the adapter plate are chamfered 26 for visual transition effect.

The back face 14 of the adapter plate 10 is provided with a radius of curvature C' that is complimentary to the radius of curvature C of the front exposed log surface 60 to which it is to be installed for snug tracking engagement therebetween. More particularly, the back face of the adapter plate is provided with an at least substantially surrounding support zone with the desired curvature, and with the reminder of the back face established at either the desired curvature, or relieved towards the front face so as to not interfere with snug engagement between the adapter back face support zone and the front face 60 of the log 62. In preferred embodiments, the support zone is established at the rectangular perimeter of the back face, as represented in FIG. 3 by the zone established between the rectangularly connected dashed lines at 14A and the outer edges of the back face.

For use with the log 62 shown, the back side support zone 14A, and in the embodiment shown, the entire back face 14, smoothly curves towards the front face and then away from the front face upon progressing from the top face towards the center and then from the center towards the bottom face. In this instance, the curvature extends for the entire height of the back face, smoothly curving at a constant curvature C' between the back edges of the top and bottom faces, and across the entire width to establish a constant thickness from side to side. Logs used for modern construction purposes are typically prepared with a radius of curvature C of between approximately six to twelve inches, and most commonly between approximately eight to ten inches. Accordingly, the preferred embodiment adapter plate is formed with a back side or back support zone radius of curvature C' at between approximately six to twelve inches.

The center opening 20 of the adapter plate 10 extends through the thickness of the plate, from the front face 12 through to the back face 14. The center opening 20 is a generally rectangular opening established by inwardly facing top, bottom and opposite sides, and is sized to slidably receive the body of the electrical box 50. The center opening 20 is provided with upper and lower center slots 28 (cutouts or other configuration relief) sized and extending sufficiently rearwardly from the front face 12 to receive the upper and lower center tabs 56 of the electrical box 50 (and screws therethrough securing the switch thereto) with the body of the box inserted through the center opening 20 and with the positioning tabs 58 of the box in contact with the pad zones 24 on the front of the adapter plate. In preferred embodiments, the center opening 20 is further provided with side slots 29 (cutouts or other configuration relief) extending from front to back through the thickness of the plate, and sized, spaced and configured to allow the release tabs 52B, screws 54, release clips 52A, and other structure extending from the sides of the electrical boxes used, to freely pass therethrough as the box is inserted into the adapter plate.

With the foregoing arrangement, installation of the switch 30 into the log 62 is accomplished generally according to the following. An opening 66 (FIG. 2A) sized to receive at least the length of the electrical box 50 that extends behind the adapter plate 10 is formed in the log through the front exposed face 60. The adapter plate is positioned against the log, with its back face 14 (or the surrounding support zone 14A established on the back face) in contact with the front face 60 of the log, and the center opening 20 aligned with the opening 66 in the log, and is secured in position against the log with nails, wood screws, or other suitable fasteners. The electrical box is then slipped into the opening 20 of the adapter plate and the opening 66 in the log until the positioning tabs 58 are in contact engagement with the pad zones 24 on the front of the adapter plate, and is secured in such position with nails, wood screws, or other suitable fasteners through clearance holes 58A into the adapter plate. Alternately, for example, the electrical box may be slipped into position in the adapter plate as shown in FIG. 2C, and the box and plate simultaneously positioned at the front of the log, with the box extending into the opening 66 in the log, and both secured in position with, for example, nails or threaded fasteners installed through the clearance holes 58A and extending through the thickness of the adapter plate and into the log. After electrical wire is drawn from passage 68 in the log, through the electrical box, and connected to the switch, the switch is secured in the box with threaded fasteners 38 through clearance holes 34 and threaded holes 56A in the box. Finally, the cover plate 40 is secured in position over the switch with threaded fasteners 38 installed through holes 44 in the plate and threaded into holes 36 in the switch.

For complimentary visual aesthetics with the logs, preferred adapter plates are either produced from wood, or from molded plastic with a preferred simulated wood exterior. Alternate visual effects will be obtained by producing the adapter plate with a non-wood, decorative appearance.

The second embodiment adapter plate 70 is shown as installed with an electrical outlet 80 and outlet cover 82 in FIGS. 8A and 8B, and is shown in detail in FIGS. 9–14. The adapter plate 70 is identical to adapter plate 10, except that it is configured for installation in landscape position, i.e., extending longitudinally along the horizontal length of the log 62. In this instance, the (support zone 74A or entire) back face 74 of the adapter plate 70 is provided with the radius of curvature C' as described above for complimentary engagement of the radius of curvature C of the log surface 52 with the adapter plate rotated 90 degrees from the orientation associated with position and use of adapter plate 10 as described above.

The remainder of the configuration, features and characteristics of the adapter plate 70 correspond to the configuration, features and characteristics of adapter plate 10. Accordingly, the adapter plate 70 includes a substantially flat front face 72 to establish (i) a cover support zone 72A similar to cover support zone 22 of adapter plate 10, and complimentary in size with the perimeter 48 (FIG. 24) on the back side of the outlet cover plate 82 (which perimeter is substantially similar to identical in size, shape and characterization as back perimeter 46 on the switch cover plate 40), to support the cover plate in a flat condition when secured in position to the outlet; and (ii) left and right side pad zones similar to pad zones 72B to provide stable contact engagement with the positioning tabs 58 of the electrical box 50 when installed into the adapter plate. The center opening 76 of the adapter plate 70 is identical in configuration to the center opening 20 of adapter plate 10, and therefore includes all center and side slots (78A, 78B) and other features and characteristics of the center opening 20, except that it is rotated 90 degrees in orientation when installed in landscape position on the log. These and all other configurations, features and aspects of adapter plate 10 as discussed above are provided for and apply equally to adapter plate 70.

The third embodiment adapter plate 90 (FIGS. 15–21, also shown as installed with an electrical outlet 82 and outlet cover plate 82, is identical to adapter plate 10 except that it is configured for installation bridging across two stacked logs 62, to establish solid contacting engagement with both logs. In this instance, the back face 94 of the adapter plate, with associated modification of the back edges of the side faces, is provided with upper and lower curved sections, 94A, 94B, with each section being formed with the radius of curvature C' as described above on face 14 to match the radius of curvature C of the upper and lower adjacent log surfaces. In the embodiment shown, each of the upper and lower curved back face sections are established with approximately one-third the curvature height of the back face 14 such that the upper section curves rearwardly, away from the front face upon progressing downwardly from the top face of the adapter plate, the lower section curves rearwardly, away from the front face upon progressing upwardly from the bottom face of the adapter plate, and a center, straight section 94C is established therebetween. Alternately, the upper and lower curved sections may be provided to meet in the center, and match complete the profile bridging across and the junction between the adjacent stacked logs.

All other configurations, features and aspects of adapter plate 10 as discussed above are provided for and apply equally to adapter plate 90, including the front face 92 and associated cover support zone and electrical box positioning tab engagement pad zones, and the center opening 96 and associated center and side slots.

The fourth embodiment adapter plate 100 shown in FIG. 22 is a double-width plate, for use with a double-cavity or two ganged electrical boxes, and two outlets, switches or other components, or a combination thereof. This double-width adapter plate is established by merging the configuration of two adapter plates 10 or 90 in a manner that provides a main open center 106 for installation of the ganged electrical boxes, a generally rectangular cover support zone on the front face 102 and generally surrounding the open center 106 to a support the back side perimeter of a double-width component cover, and left and right pairs of upper and lower pad zones between the open center and the cover support zone for contacting support of the positioning tabs 58 of two, side-by-side outlets, switch, or other components. The back side of adapter plate 100 is provided with a curvature C" as desired for snug tracking engagement with a log, or with adjacent stacked logs, as discussed above in connection with adapter plates 10 and 90. The fifth embodiment adapter plate 110 (FIG. 23) is a similarly configured triple-width adapter plate, for use with three ganged electrical boxes, three associated components, and a triple-width component cover plate. Those skilled in the arts will appreciate and recognize that additional embodiment adapter plates will be readily devise within the scope of the present invention.

Advantageously, adapter plates in accordance with the invention may be installed into existing switch and outlet locations in log-construction buildings to change or improve visual aesthetics in the building. The presence of previously formed flat surfaces on the logs, to which the electrical boxes and component cover plates were secured, will not hinder or otherwise affect use of adapter plates provided with an additional perimeter of material, outside the cover support zone, thus providing adapter plates larger than the previously formed flat surfaces. Consequently, installation of such adapter plates will entirely cover the previously formed flat surfaces, and will engage the curved portions of the logs around such flat surfaces to establish the desired tracking, stable installation onto the logs.

From the foregoing, it will be understood that the present invention brings to the art a new and unique adapter plate that provides for improved ease of installation of electrical switch, outlets and other components into exposed logs in log-construction buildings. Provision of the back curved surface for tracing engagement with a log of logs, the front flat zone to support the back of the component cover, and the front pad zones to support the electrical box, cooperate to establish a smooth, stable transition between the curvature of the exposed logs, the mounting tabs of the electrical boxes, and the back of the component covers, relatively quick, yet fully supported installation of the electrical box and components into the curved surfaces of the logs. Consequently, the adapter plates eliminate the need to provide a flat surface on the logs prior to installation of the electrical box and components, and therefore reduces installation time and costs associated therewith. Among other things, the adapter plates are adaptable for installation in both portrait and landscape orientation modes, on horizontal and vertical (or otherwise oriented) logs as well as on other curved wall surfaces, with single, double, triple, or any number of ganged electrical boxes, and both on a single log or bridging across adjacent logs. Further, the adapter plates offer flexibility and improvement in the visual aesthetics of the installed electrical components not available using prior art methods and techniques. In short, adapter plates of the present invention provide ease of installation in a variety of situations, and numerous advantages over prior art methods, including reduced labor cost and enhanced visual aesthetics.

I claim:

1. A unitary construction adapter plate for installing (i) a generally rectangular box onto the curved exposed face of a log, (ii) a component having positioning tabs on opposite ends thereof into the box, and (iii) a cover having a flat back side perimeter over the component and the box, the adapter plate comprising:
    a) top and bottom sides,
    b) left and right sides extending between the top and bottom sides,
    c) a back side extending between the top, bottom, left and right sides, the back side having a rearwardly facing curvature with its center of curvature rearwardly thereof,
    d) a front side extending between the top, bottom, left and right sides, the front side having (i) a flat cover support zone, and (ii) substantially flat positioning-tab support zone pads at opposite ends thereof, the cover support zone and the positioning-tab support zone pads being located forwardly of the curvature on the back side, and
    e) a generally rectangular opening extending from the front side through the back side, the cover support zone generally surrounding the opening at the front side.

2. A method for installing an electrical component into the curved exposed face of a log in a log-construction facility, the method comprising:
    a) providing
        i) an electrical box,
        ii) an electrical component having positioning tabs on opposite ends thereof,
        iii) a cover having a flat back side perimeter, and
        iv) an adapter plate comprising:

a) surrounding top, bottom, left and right sides,
b) a back side having a rearwardly facing curvature complimentary to the curvature of the exposed face of the log,
c) a front side having (i) a flat cover support zone, and (ii) substantially flat support zone pads at opposite ends thereof, the cover support zone and the support zone pads being located forwardly of the curvature on the back side, and
d) an opening extending from the front side through the back side, the cover support zone generally surrounding the opening at the front side;

b) forming on opening sized to receive the electrical box in the log through the curved exposed face of the log;

c) installing the electrical box into the opening in the adapter plate;

d) securing the electrical box and adapter plate to the curved exposed face of the log with the curvature on the back side of the adapter plate at the curved exposed face of the log and with the electrical box extending through the adapter plate into the opening in the log;

e) securing the positioning tabs of the electrical component to the support zone pads of the adapter plate; and f) securing the cover to the electrical component with the flat back side perimeter of the cover in contact engagement with the cover support zone of the adapter plate.

3. The adapter plate as defined in claim 1 in which the back side is formed with a single concave curvature extending generally from top to bottom.

4. The adapter plate as defined in claim 1 in which the back side is formed with a pair concave curvatures positioned from top to bottom in relation to one another to bridge the junction between two stacked logs.

5. The method as defined in claim 2 in which the back side of the adapter plate is formed with a single concave curvature extending generally from top to bottom.

6. The method as defined in claim 2 in which the back side of the adapter plate is formed with a pair concave curvatures positioned from top to bottom in relation to one another to bridge the junction between two stacked logs.

* * * * *